(No Model.) J. W. HYATT. 5 Sheets—Sheet 4.
FILTER.

No. 273,542. Patented Mar. 6, 1883.

Attest:
Walter Fowler,
Chas. C. Gill

Inventor:
John W. Hyatt.
by his Atty
Rowland Cox.

(No Model.)
5 Sheets—Sheet 5.
J. W. HYATT.
FILTER.
No. 273,542. Patented Mar. 6, 1883.
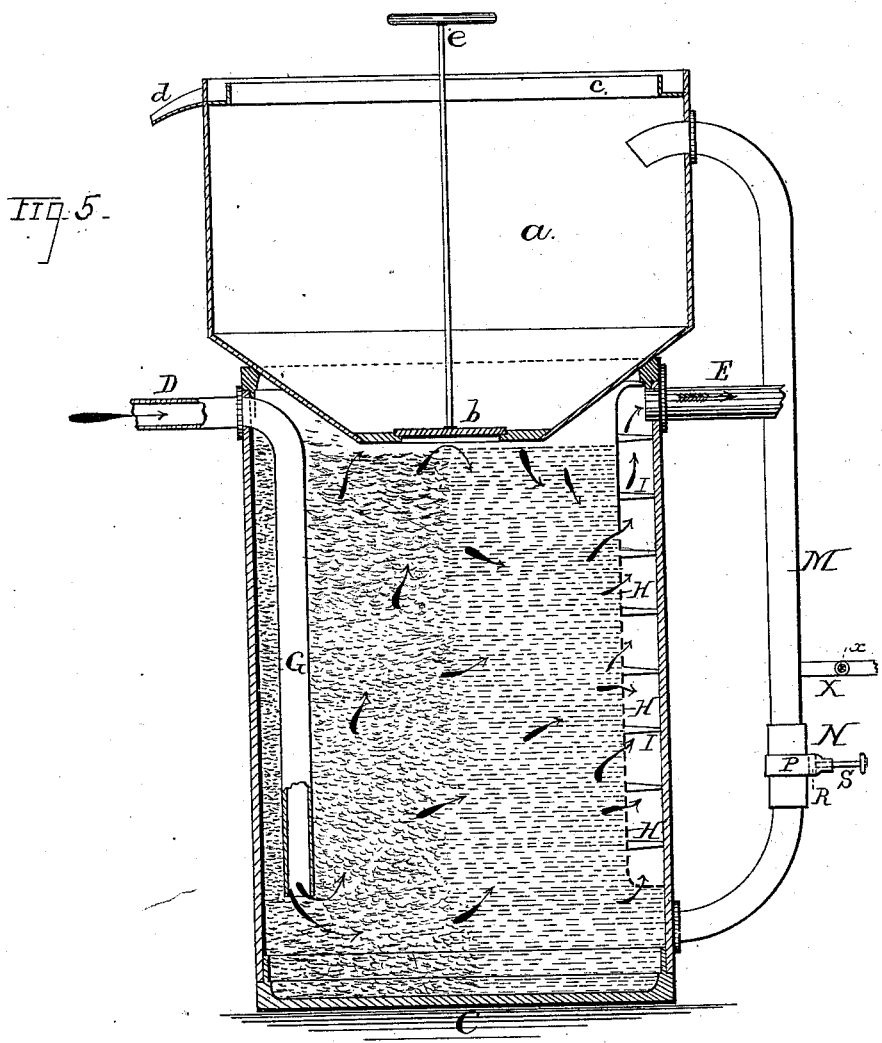
Witnesses;
Chas. C. Gill
Herman Gustow
Inventor;
John W. Hyatt,
By his Attorney,
Rowland Cox

UNITED STATES PATENT OFFICE.

JOHN W. HYATT, OF NEWARK, NEW JERSEY.

FILTER.

SPECIFICATION forming part of Letters Patent No. 273,542, dated March 6, 1883.

Application filed September 15, 1882. (No model.)

*To all whom it may concern:*

Be it known that I, JOHN W. HYATT, a citizen of the United States, residing at Newark, in the county of Essex and State of New Jersey, have invented certain new and useful Improvements in Filters; and I do hereby declare the following to be a full, clear, and exact description of the invention, such as will enable others skilled in the art to which it appertains to make and use the same.

The invention relates to improvements in filters; and it consists in certain novel apparatus for the filtration of water and for the cleansing of the filter-beds.

The object of the invention is to filter water more effectively and in larger volumes than it has been heretofore possible with the apparatus now in use.

The particular improvements and advantages which are incident to my apparatus and the new and original processes of cleansing the filter-beds will appear from the detailed description hereinafter presented, reference being had to the accompanying drawings, in which—

Figure 1:
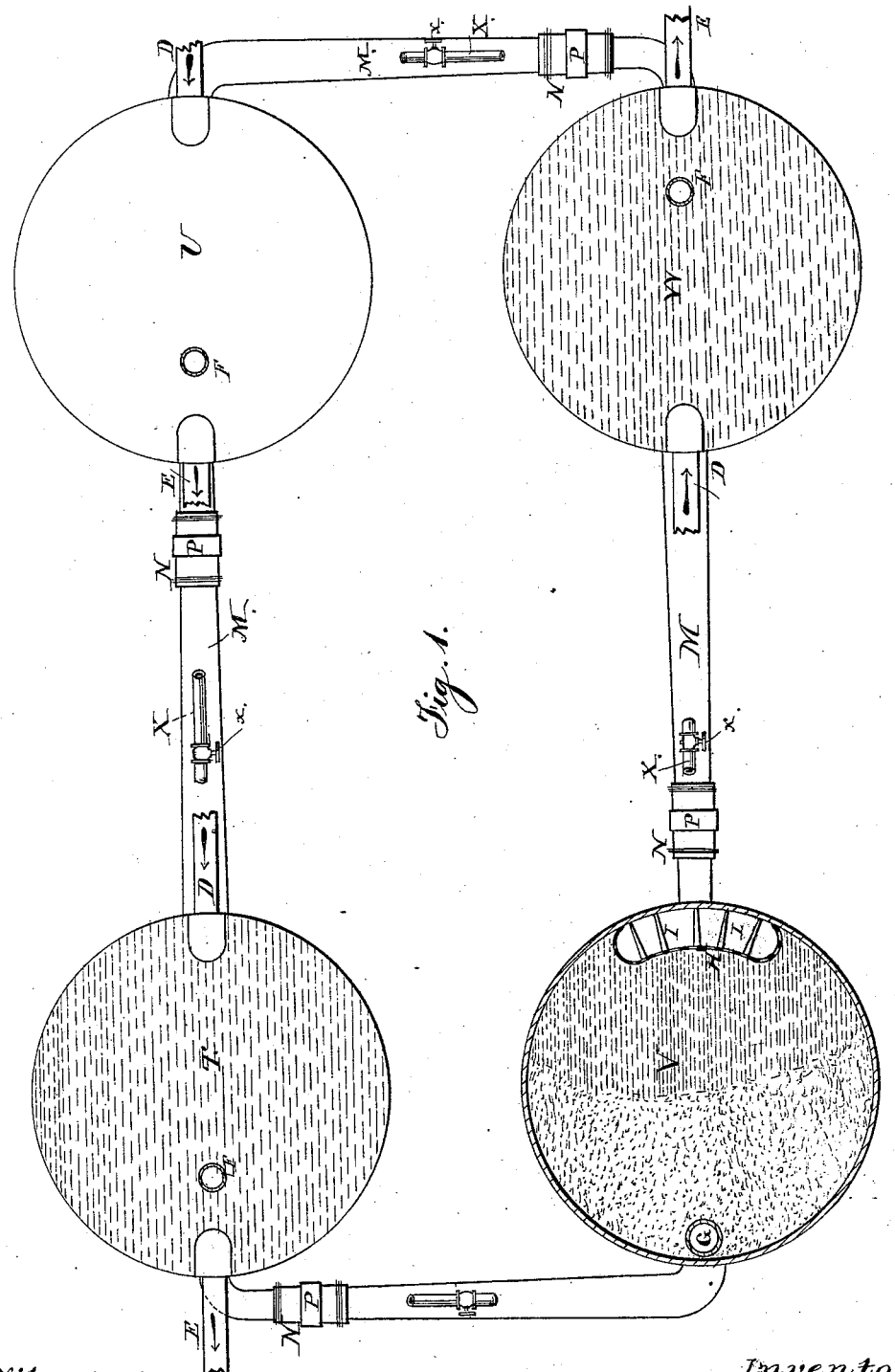
Figure 2:
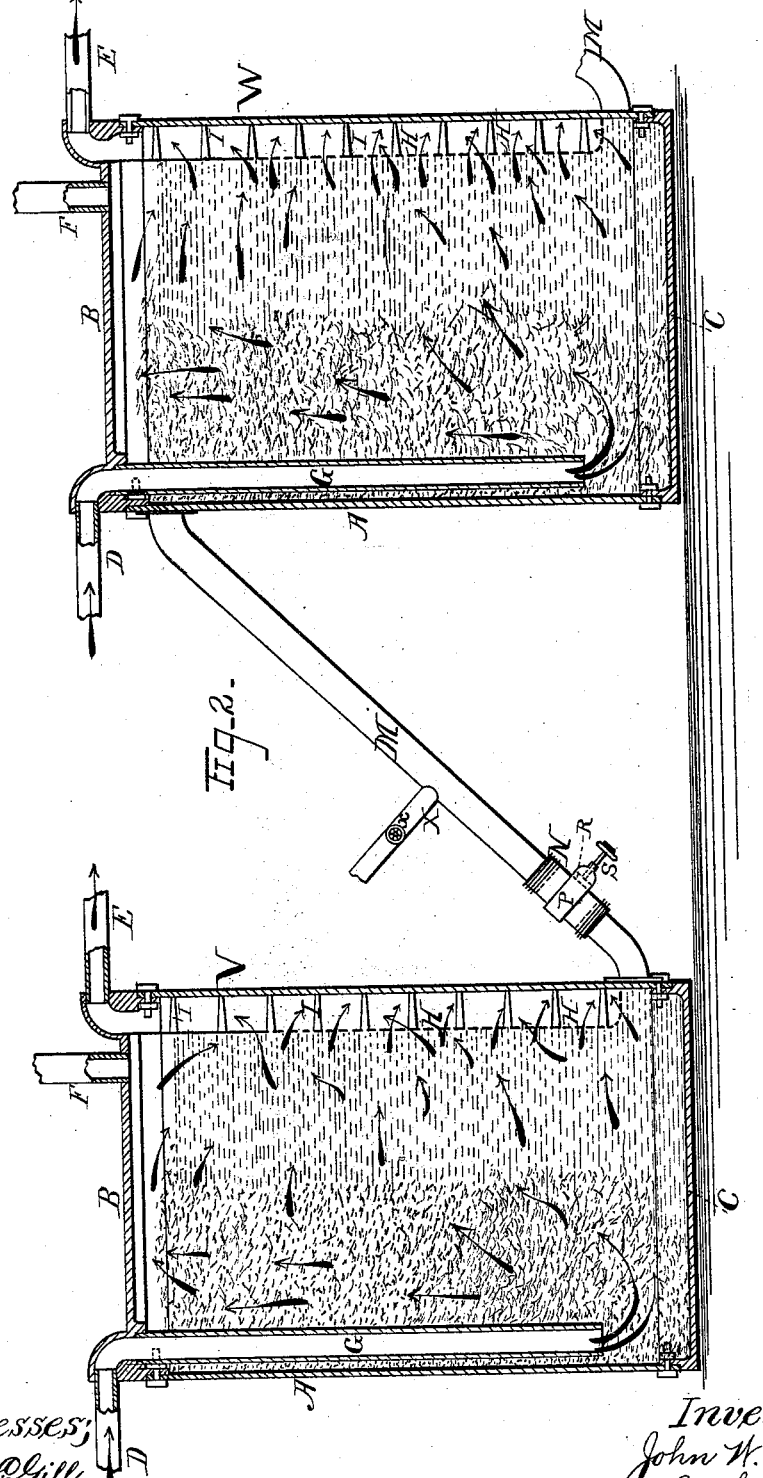
Figure 3:
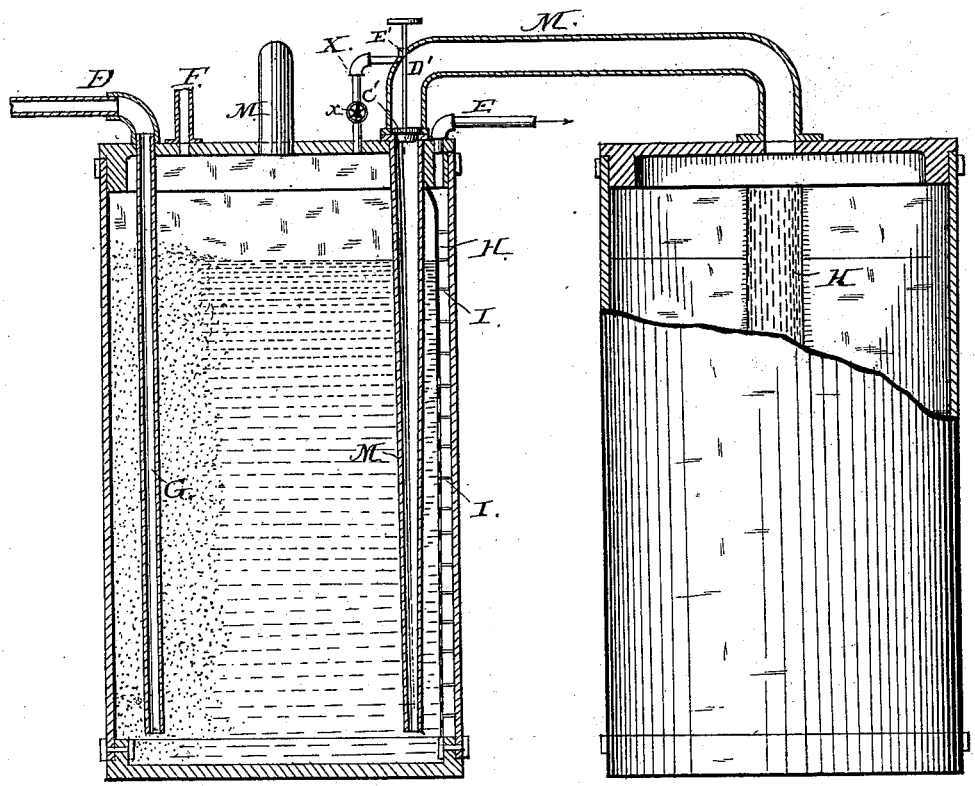
Figure 4:
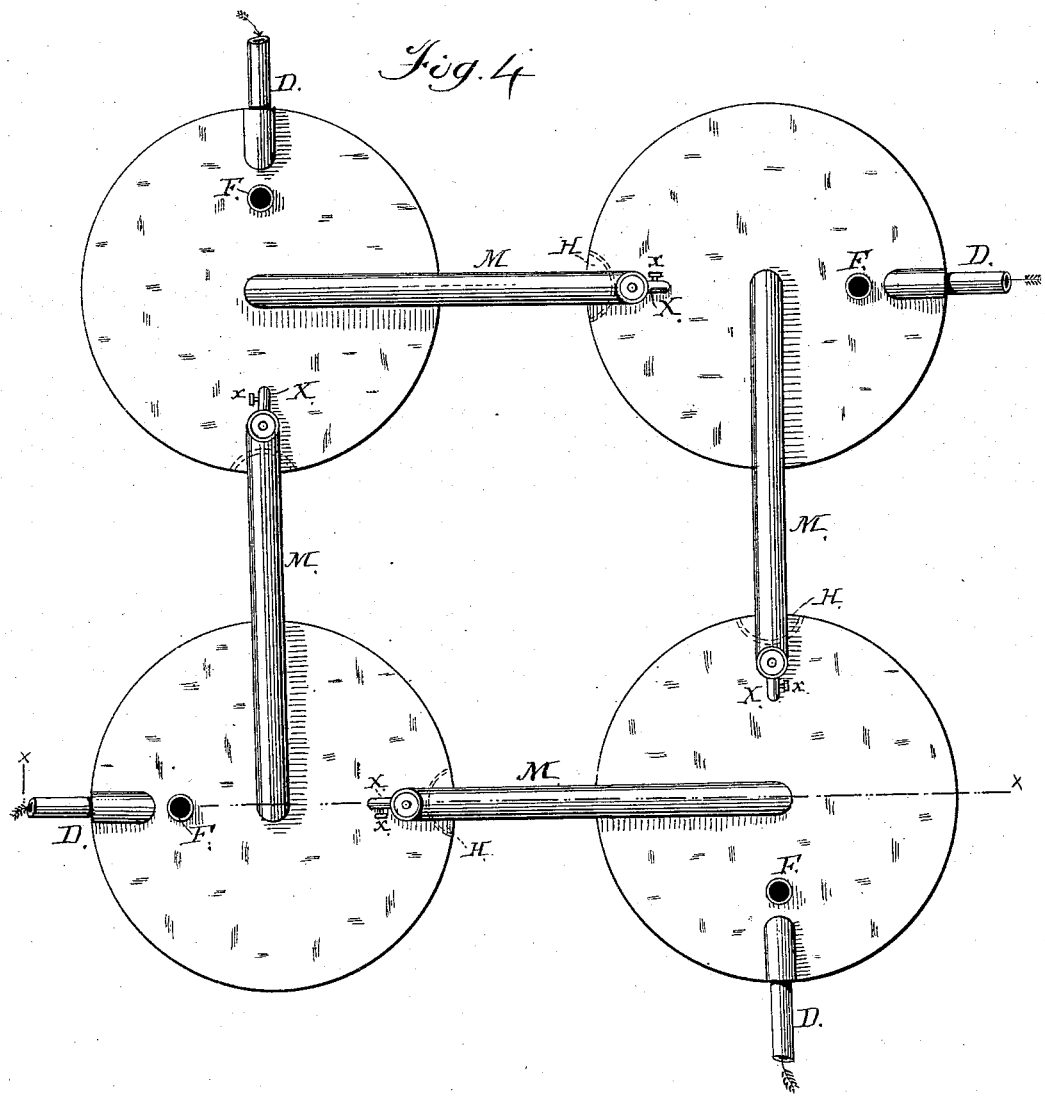

Figure 1 is a plan view of a series of filters composing my apparatus, the top of one of the filters being removed, with the supply and delivery pipes, for the purpose of illustrating the perforated section of material H and the filter-bed. In two of the other filters composing the apparatus the filter-beds are shown in dotted lines, the filter V containing no filter-bed. Fig. 2 is a central vertical longitudinal section of two of the same. Fig. 3 is a vertical section of a modified form of construction, and Fig. 4 is a top view of same. Fig. 5 is a central vertical section of a single filter, illustrating the invention. Fig. 6 is a detached view, illustrating the form of the stirrup P.

As indicated in the said drawings, either the series of filters or a single filter may be used in carrying out the purposes of my invention.

I will first describe one of a series of filters and its operation, and then set forth the construction, arrangement, and advantages of the series of filters.

The filter will consist, preferably, of a cylindrical shell or receptacle, A, of boiler-iron, having a cast-iron head, B, and base C, and having at its upper portion an inlet-pipe, D, for the unfiltered water, and an outlet-pipe, E, for the cleansed water, and a waste-pipe, F, through which the water used in cleaning the filter-bed may issue. The apparatus will contain a bed of sand or other suitable filtering agent, which will nearly fill the same. The inlet D to the apparatus for the unfiltered water will be through the pipe G, which will penetrate the bed of sand and issue the water into the lower part of the filter. If a series of inlet-pipes are employed, I will arrange their lower ends at differential heights, so that the water will be delivered at various points through the lower half of the bed of filtering agent. On the side of the filter opposite to the inlet-pipes is provided a section of perforated material, H, against which the sand is placed and through which the water issues in a purified condition to the outlet E. The perforated metal H will be separated from the side of the casing of the filter by means of lugs or pins I, and will be of a suitable nature to permit the passage through it of the water, but will prevent the escape of the sand or other filtering agent.

The operation of the filter above described is as follows: The water passes through the inlet-pipe to the lower portion of the filter-bed. A large portion of it then passes upward through the vertical portion of the filter-bed, adjacent to the inlet-pipes, to the space in the upper portion thereof, and thence downward again through the material comprising the quiescent portion of the bed, and thence through the perforated material H into the outlet. Those portions of the water which do not rise upward to the top of the bed, as indicated above, will pass across through the filter-bed to the perforated material H, and then escape in a purified condition. The effect of delivering the water at one side of the apparatus and adjacent to the lower portion of the filtering material is to cause the sand or other agent in the vertical portion of the filter-bed adjacent to the inlet-pipes to be very much agitated and loosened, whereby the water will rise in large quantities passing through the said portion of the filter-bed readily and rapidly, and thence find its way to the quiescent portion of the filter-bed. During this operation of filtering water the whole body of the sand is brought into active use, and is caused to assume such condition and consistency as will best adapt it for the purpose for which it is intended.

In the employment of a series of the filters above described for cleaning large quantities of water the preferred arrangement will be as follows, where, for instance, an apparatus consisting of four filters is made use of: Each of the filters will be supplied with all of the elements mentioned above as belonging to the filter first hereinbefore described, and in addition thereto will be provided with the connecting-pipes M, which pass from the lower side of each filter (at a point by preference directly opposite to the inlet-pipes) to the adjacent filter, at the upper portion of which it enters. Each of the filters is connected with the adjacent filter by the pipes M, so that when all the filters are connected there will be a communication from one to the other, forming an unbroken circuit through the whole series. The pipes M will be supplied with valves N at or near their lower ends, and the preferred construction will be to have them tapered slightly from their upper ends downward. The object of having the pipes M taper from their upper end downward is to facilitate the passage through them of the filtering material during the process of washing the filter-beds, as hereinafter described. The valve N is of peculiar construction, and is specially adapted for pipes through which a current of sand and water is to pass. It is plain that but few valves would stand the conditions to which they would be subjected in a pipe used for this purpose. There is a break in the pipes M, as indicated in dotted lines, and over this break I slip a section of strong rubber hose, the ends of which are clamped or wired in place, and centrally upon this rubber section of hose I place a stirrup, P, having a follower, R, controlled by a set-screw, S. This composes the valve N, which may be closed by crowding the follower R down upon the hose until its two sides are in contact with each other, and may be opened by the reverse of this movement. Where a series of filters are used one of them will be left empty—i. e., containing no filtering agent, but only water—for convenience and to aid the operation of cleaning the beds. Hence we will consider that the filters T U V are all in operation, their inlet and outlet pipes being by preference connected with a common supply and delivery, and the filter W being idle and containing no filtering agent. It will be desirable not to stop the process of filtration entirely during the operation of washing the beds. Hence one of the filters will be cleansed while the other two will continue their operation.

If it is desired, for instance, to clean the bed of filtering agent in the filter V, the water from the inlet will be continued as before, the waste-pipe will be partially open and the outlet-pipe closed. The valve N in the pipe M, leading to the filter W, will be opened. The effect of this arrangement is that the water will drive the sand (and pass with it) upward through the pipe M and fall into the empty filter W, whereby it is thoroughly agitated, and the water passing with it and through it, and escaping through the waste-pipe with the silt and other impurities, it is effectually cleansed. The filter V now is empty and the filter W is full of cleaned filtering agent. The sand in the filter W may be now used for filtering water, the filter V being used to receive the sand from the filter T in the same manner as the sand was brought from the filter V into the filter W. In cleaning the sand-beds the sand will be brought at will from one filter to the other, one being always left empty and idle. The sand is thoroughly agitated and cleansed, and is in condition, when emptied into the adjoining filter, for a continuation of the operation of the invention. The transfer of the filter-bed from one receptacle to another by means of a current of water brings the elements of the said bed in frictional contact with each other and with the current of water, and for this reason and on account of the precipitation of the filtering agent in falling through the water from the upper to the lower part of the receptacle the silt and other impurities are loosened from the filtering agent and escape through the waste-pipe with the water, whereby the filter-bed is effectually cleansed.

In Figs. 3 and 4 I illustrate a modified form of construction which embodies the principles of the filter shown in Figs. 1 and 2, and is different from it only in the arrangement of the transfer-pipe M. In this modification four filters are shown, and the transfer-pipe passes from the interior and at one side of each filter, respectively, to the center of the adjacent filter. The position of the tapered transfer-pipe M is clearly indicated in Fig. 3, in which figure it will be observed that the mouth of the pipe is at the lower part of the filter, while the body thereof tapers upward to the top of same, and there meeting the horizontal portion it extends to the center of the adjoining filter. The valve for the pipe M in this modification is placed at the top of the filter, as shown, and consists in this instance of the disk C' and threaded stem D', which passes upward through the internally-threaded lug E', and is supplied with a handle by which it may be operated. The jet-pipe X, having a valve, x, in this construction, passes from the top of the filter and enters the pipe M at a point about on a line with the center of its horizontal portion. During the operation of washing the filter-bed the force of water in the filter will cause a jet or small stream to flow through the pipe X into the current of sand passing through the pipe M, which jet or small stream will facilitate the passage of said current and effectually prevent any clogging of the material in the pipe M. It also assists in loosening the impurities from the filtering agent.

In Fig. 3 I show a single filter provided with a sand-receptacle, a, instead of employing a series of filters, as illustrated in Figs. 1 and 2. In the filter shown in Fig. 3 the elements described in Figs. 1 and 2 are all employed, the difference being that the sand-pipe M, instead of leading to an empty filter, leads to the receptacle a, placed directly over the apparatus. The receptacle a will be of sufficient size to receive the bed of filtering agent, and will be provided in its bottom with a valve, b, through which the sand or other material used as the filtering agent may pass into the filter proper at the time desired. The upper edge of the receptacle a will be provided with a waste-trough, c. In the operation of washing the filter-bed I close the outlet E and allow the inlet D to remain open and the flow of water continued, the valve N being opened. The effect of this is to drive the sand through the pipe M into the receptacle a, during which time, the flow of water being continued, the silt and other impurities will be loosened from the sand and will flow with the waste water over the trough c and away by means of spout d. After the sand has been thus cleansed the valve b is opened by turning the rod and wheel e, and the filtering agent allowed to fall through the same downward into the cylinder A, when it will be in proper condition for further use. The operation of this embodiment of the invention illustrated in Fig. 3 will be fully understood in view of the description of Figs. 1 and 2, and need not be more specifically set forth.

Under some conditions it may be found desirable to facilitate the passage of the sand through the pipe M by a jet of water, and in such cases a pipe, X, having a valve, x, may be supplied. In some instances this will not be required, but will be found advantageous in nearly every case, as it assists the flow of the filtering material and the removal of the impurities.

What I claim as my invention, and desire to secure by Letters Patent, is—

1. In cleansing granular filter-beds, the method of removing the impurities therefrom by transferring the filtering substance, under water-pressure, from one compartment to another in such manner that the particles of which the bed is composed are brought in frictional contact with one another and with the water and are thereby purified, which consists in inducing a current of the filtering substance, together with a stream of water, from one containing compartment or receptacle to another and conducting the separated impurities away with the waste water, substantially as set forth.

2. The filter herein described, consisting of a receptacle containing a bed of filtering material, an inlet arranged to deliver the water at one side and in the lower part of the said bed, the outlet E, and the perforated section H, arranged on the side of the filter opposite to the inlet, in the manner described, and for the purposes expressed.

3. The filter herein described, containing a bed of filtering agent and provided with the inlet for unfiltered water, the outlet for the filtered water, and the tapered pipe M, having a valve, and being connected with a suitable receptacle to receive the bed of filtering agent during the process of washing the same, the transfer of the bed from the filter to the said receptacle being induced through the pipe M, substantially as set forth.

4. The filtering apparatus herein described, consisting of a series of filters, each supplied with independent inlet and outlet pipes and connected with each other, so as to form an unbroken circuit, by means of the pipes M, provided with valves, which pipes pass from the lower portion of one filter to the upper portion of the adjacent filter, and are adapted to permit the transfer through them of the bed of filtering material when it is desired to clean the same, substantially as specified.

5. In a filtering apparatus consisting of two or more receptacles having a suitable supply and delivery, the transfer-pipe M and jet-pipe X, as and for the purposes set forth.

In testimony whereof I affix my signature in presence of two witnesses.

JOHN W. HYATT.

Witnesses:
CHAS. C. GILL,
HERMAN GUSTOW.